United States Patent
Stam et al.

(10) Patent No.: US 9,802,201 B2
(45) Date of Patent: Oct. 31, 2017

(54) BALE PROCESSOR AND FLAIL FOR USE WITH SAME

(71) Applicant: VERMEER MANUFACTURING COMPANY, Pella, IA (US)

(72) Inventors: Phil Stam, Pella, IA (US); Lucas Graham, New Sharon, IA (US); Wanti Muchtar, Pella, IA (US); David Landon, Pella, IA (US); Bjorn Johnson, Altoona, IA (US); Phil Egging, Reasnor, IA (US); Tyler Schiferl, Pella, IA (US); Luke Mushitz, Yankton, SD (US)

(73) Assignee: Vermeer Manufacturing Company, Pella, IA (US)

( * ) Notice: Subject to any disclaimer, the term of this patent is extended or adjusted under 35 U.S.C. 154(b) by 257 days.

(21) Appl. No.: 14/616,489

(22) Filed: Feb. 6, 2015

(65) Prior Publication Data

US 2015/0151303 A1 Jun. 4, 2015

Related U.S. Application Data

(63) Continuation-in-part of application No. PCT/US2014/054113, filed on Sep. 4, 2014, which is
(Continued)

(51) Int. Cl.
*B02C 13/00* (2006.01)
*B02C 13/28* (2006.01)
(Continued)

(52) U.S. Cl.
CPC ............ *B02C 13/28* (2013.01); *A01F 29/005* (2013.01); *A01K 5/002* (2013.01); *A01K 5/005* (2013.01)

(58) Field of Classification Search
CPC ........ A02F 29/005; A02F 29/10; A02F 29/12; A01D 87/0007; B02C 13/28; A01F 29/005; A01F 29/12
(Continued)

(56) References Cited

U.S. PATENT DOCUMENTS 9,114 A * 7/1852 Gilbert .................... A01F 12/20
460/71
1,787,526 A * 1/1931 Honstain ................ B22D 19/00
164/111
(Continued)

FOREIGN PATENT DOCUMENTS

JP 2002-346409 12/2002
WO WO2004/075632 9/2004
(Continued)

OTHER PUBLICATIONS

PCT/US2014/054113, International Search Report & Written Opinion dated Feb. 17, 2015, 13 pages.
(Continued)

*Primary Examiner* — Faye Francis
(74) *Attorney, Agent, or Firm* — Lathrop Gage LLP

(57) ABSTRACT

In one embodiment, a bale processor includes a hopper for receiving baled material, a discharge opening for outputting chopped material, and primary and secondary rotors. The primary rotor has an axis of rotation and a rotatable flail to chop the material from the bale received in the hopper. The secondary rotor is rotatable to chop the material after being chopped by the primary rotor, and the secondary rotor is offset from the primary rotor such that the primary rotor is between the secondary rotor and the discharge opening. The flail includes a pivot tube for rotating about the axis, first and second hammers secured to the pivot tube, and a paddle. The paddle is positioned between and secured to the first and second hammers to generate airflow when the first and
(Continued)

second hammers are rotated at an operating speed, thereby increasing a throw distance of the chopped material.

19 Claims, 13 Drawing Sheets

Related U.S. Application Data a continuation of application No. 14/290,558, filed on May 29, 2014, and application No. 14/616,489, which is a continuation-in-part of application No. PCT/US2014/063336, filed on Oct. 31, 2014.

(60) Provisional application No. 62/077,142, filed on Nov. 7, 2014, provisional application No. 61/898,037, filed on Oct. 31, 2013.

(51) Int. Cl.
    *A01F 29/00*     (2006.01)
    *A01K 5/00*     (2006.01)

(58) Field of Classification Search
    USPC .......................................... 241/101.76, 605
    See application file for complete search history.

(56) References Cited

U.S. PATENT DOCUMENTS

| | | | | |
|---|---|---|---|---|
| 2,752,160 A * | 6/1956 | Fahrner | ................... | A01F 29/04 239/650 |
| 2,753,908 A * | 7/1956 | Anderson | ................. | B02C 7/10 241/135 |
| 3,208,491 A * | 9/1965 | Bliss | ..................... | A01F 29/005 241/186.35 |
| 3,589,627 A | 6/1971 | Torrence | | |
| 3,863,850 A * | 2/1975 | Freeman | ................ | A01D 90/10 241/101.762 |
| 3,915,392 A * | 10/1975 | Kugler | .................. | A01F 29/005 241/223 |
| 4,779,810 A | 10/1988 | Frey | | |
| 5,042,973 A * | 8/1991 | Hammarstrand | ....... | A01F 12/40 460/112 |
| 5,232,405 A * | 8/1993 | Redekop | ................. | A01F 12/40 460/112 |
| 5,272,861 A * | 12/1993 | Roynberg | ............ | A01B 33/144 172/91 |
| 5,447,276 A | 9/1995 | Aldridge et al. | | |
| 5,482,508 A * | 1/1996 | Redekop | ................. | A01F 12/40 460/112 |
| 5,597,125 A | 1/1997 | Bouldin | | |
| 6,109,553 A | 8/2000 | Hruska | | |
| 6,409,110 B1 | 6/2002 | Piper et al. | | |
| 6,478,674 B2 * | 11/2002 | Redekop | ................. | A01F 12/40 460/112 |
| 6,692,351 B2 * | 2/2004 | Johnson | .................. | A01F 12/40 460/112 |
| 6,699,121 B2 * | 3/2004 | Bognar | .................... | A01F 29/02 460/112 |
| 7,546,966 B2 | 6/2009 | Lepage et al. | | |
| 7,621,477 B2 * | 11/2009 | Young | ..................... | B02C 13/28 241/194 |
| 7,757,980 B2 | 7/2010 | Oare et al. | | |
| 8,221,203 B1 * | 7/2012 | Flickinger | ............... | A01F 12/40 460/112 |
| 8,231,072 B2 * | 7/2012 | Willibald | ............... | A01B 33/08 241/294 |
| 8,800,903 B1 * | 8/2014 | Young | ..................... | B02C 13/18 241/189.1 |
| 2002/0169011 A1 * | 11/2002 | Wilson | .................... | A01F 12/40 460/111 |
| 2007/0023554 A1 * | 2/2007 | Young | ..................... | B02C 13/04 241/197 |
| 2009/0321546 A1 * | 12/2009 | Plumb | ..................... | B02C 13/28 241/27 |
| 2011/0042498 A1 * | 2/2011 | Young | ................. | B02C 13/2804 241/195 |

FOREIGN PATENT DOCUMENTS

| | | |
|---|---|---|
| WO | WO2013/066287 | 5/2013 |
| WO | WO2013/112841 | 8/2013 |

OTHER PUBLICATIONS

U.S. Appl. No. 14/290,558 Non-Final Office Action dated Jan. 20, 2017, 12 pages.

\* cited by examiner

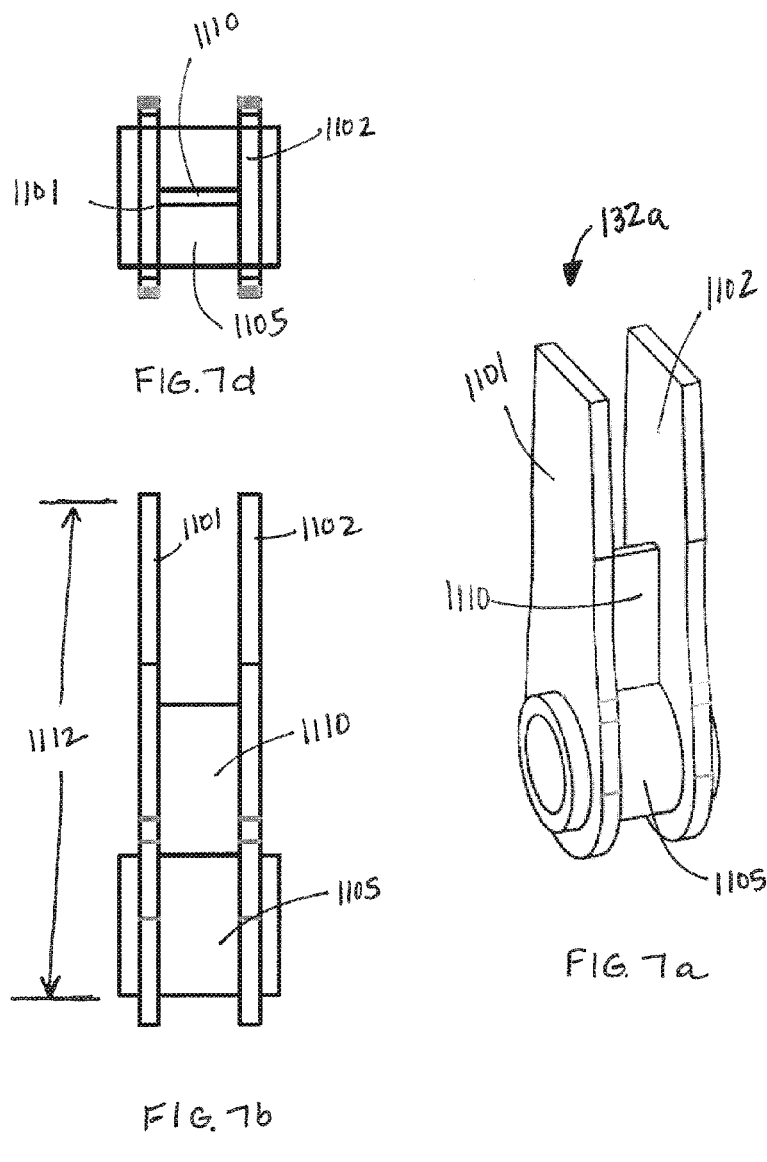

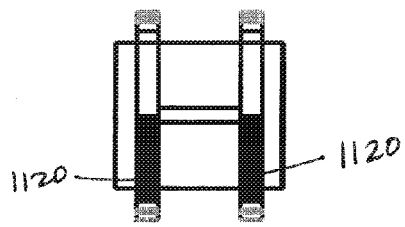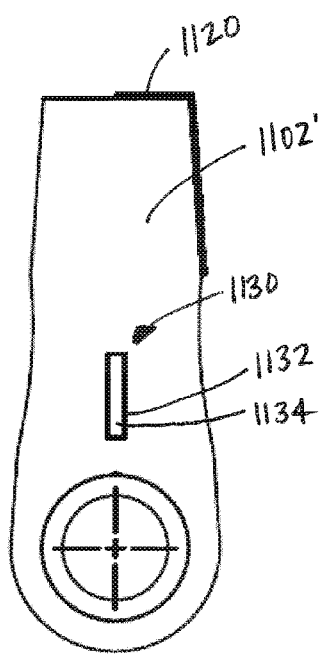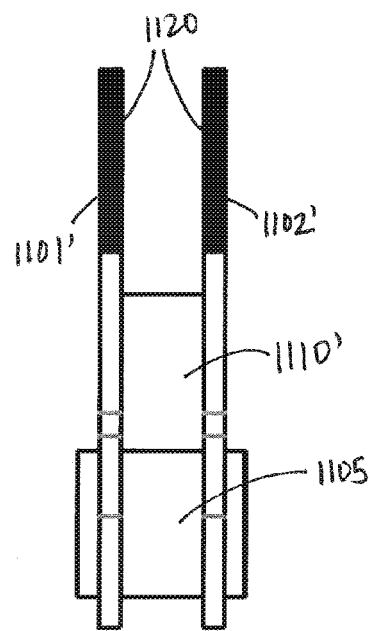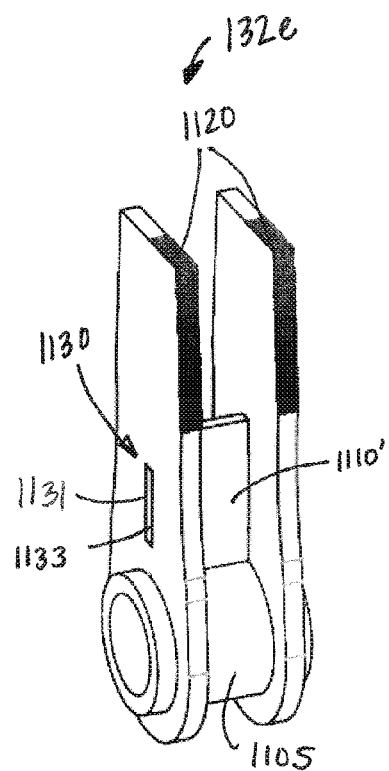
FIG. 11d
FIG. 11c
FIG. 11b
FIG. 11a

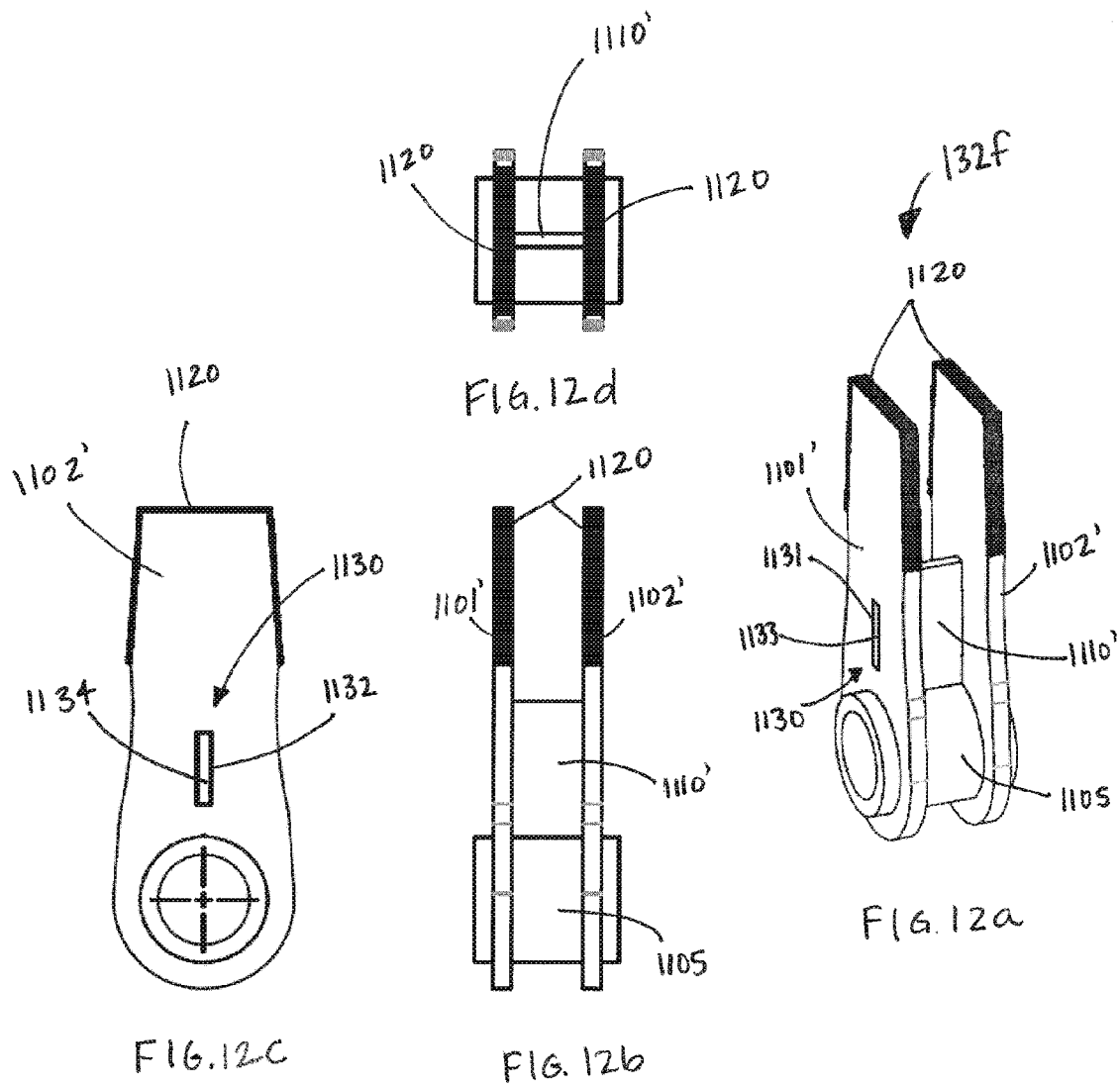

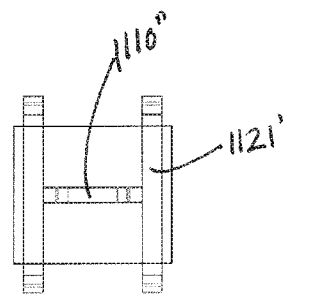
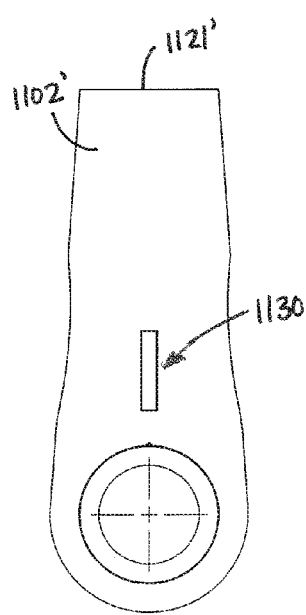
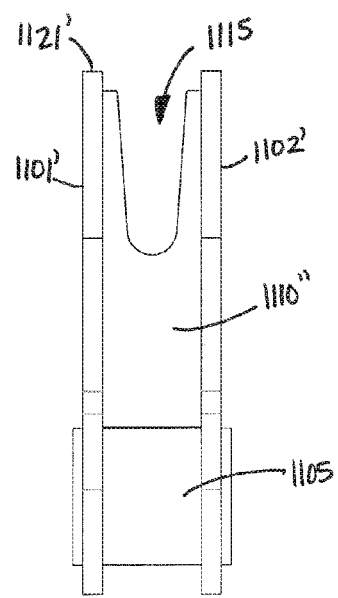
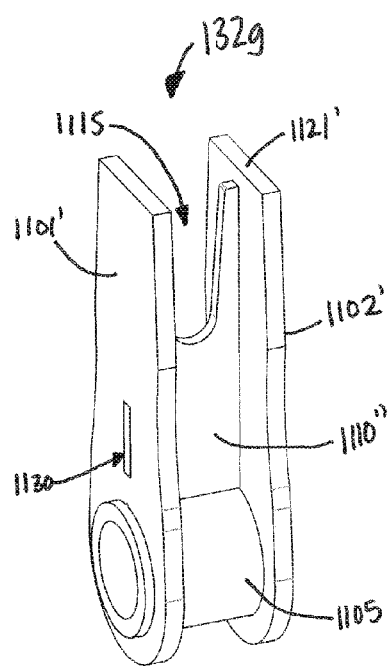
FIG. 13d
FIG. 13c  FIG. 13b  FIG. 13a

BALE PROCESSOR AND FLAIL FOR USE WITH SAME

RELATED APPLICATIONS

This application claims priority to U.S. Patent Application Ser. No. 62/077,142, filed Nov. 7, 2014. This application is also a Continuation-In-Part of PCT Patent Application Serial No. PCT/US14/54113, filed Sep. 4, 2014, whichs claim priority to U.S. patent application Ser. No. 14/290,558, filed May 29, 2014. This application is also a Continuation-in-Part of PCT Patent Application Serial No. PCT/US2014/063336, filed Oct. 31, 2014, which claims priority to U.S. Provisional Application Ser. No. 61/898,037, filed Oct. 31, 2013. Priority is claimed to each, and the disclosure of each is incorporated herein in its entirety by reference.

BACKGROUND

The current invention relates generally to bale processors. Bale processors are devices used to spread the content of bales of bale filamentary material in a controlled way for reasons such as mulching or feeding livestock. Examples of bale processors are shown in PCT/US2013/023153 filed by Vermeer Manufacturing Company, published as WO2013/112841; and PCT/US2011/058514 filed by Vermeer Manufacturing Company, published as WO2013/066287. Both of those publications are incorporated herein by reference in their entirety—and form part of—the current disclosure.

In general, prior art bale processors have limited abilities to output chopped material at different selected lengths.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a bale processor includes a hopper for receiving baled material, a discharge opening for outputting chopped material, and a processing section. The processing section has primary and secondary rotors. The primary rotor has an axis of rotation and is rotatable to chop the baled material from the hopper. The secondary rotor is rotatable to chop the material after being chopped by the primary rotor, and the secondary rotor is offset from the primary rotor such that the primary rotor is between the secondary rotor and the discharge opening.

According to another embodiment, a bale processor includes a hopper for receiving baled material, a discharge opening for outputting chopped material, and a processing section below the hopper and intersecting the hopper at an impingement zone. The processing section has primary and secondary rotors. The primary rotor is rotatable and has flails sufficiently long to extend into the impingement zone to chop the material from the hopper when the primary rotor is rotated. The secondary rotor is rotatable and has flails to chop the material after being chopped by the primary rotor. The secondary rotor is offset from the primary rotor such that the secondary rotor is on one side of the primary rotor, the discharge opening is on another side of the primary rotor, and the only passage from the secondary rotor to the discharge opening crosses the primary rotor.

According to still another embodiment, a method of processing baled material includes providing a bale processor having a hopper for receiving baled material, a discharge opening for outputting chopped material, a primary rotor that is rotatable and has an axis of rotation, a secondary rotor that is rotatable and has an axis of rotation generally parallel to the primary rotor axis of rotation, a disengagement mechanism in communication with the secondary rotor for altering the secondary rotor between engaged and disengaged configurations, and a movable internal deflector. The secondary rotor is offset from the primary rotor such that the primary rotor is between the secondary rotor and the discharge opening. The method further includes: using the disengagement mechanism to alter the secondary rotor between the engaged and disengaged configurations; moving the internal deflector to allow generally unobstructed passage between the primary rotor and the secondary rotor when the secondary rotor is in the engaged configuration, and to shield the secondary rotor from the primary rotor when the secondary rotor is in the disengaged configuration; providing baled material in the hopper; and rotating the primary rotor in a first direction to chop the baled material from the hopper such that the material chopped by the primary rotor temporarily travels away from the discharge opening. When the secondary rotor is in the engaged configuration, the secondary rotor is rotated in the same direction as the primary rotor such that the secondary rotor rotates material away from and subsequently back toward the primary rotor; rotation of the primary rotor and the secondary rotor results in three distinct chopping phases: first, chopping by the primary rotor; second, chopping by the secondary rotor; and third, additional chopping by the primary rotor. When the secondary rotor is in the disengaged configuration, the material chopped by the primary rotor is passed to the discharge opening without encountering the secondary rotor.

According to a further embodiment, a bale processor includes a hopper for receiving baled material, a discharge opening for outputting chopped material, and a processing section having primary and secondary rotors. The primary rotor has an axis of rotation and a rotatable flail to chop the material from the bale received in the hopper. The secondary rotor is rotatable to chop the material after being chopped by the primary rotor, and the secondary rotor is offset from the primary rotor such that the primary rotor is between the secondary rotor and the discharge opening. The flail includes a pivot tube for rotating about the axis of rotation, first and second hammers secured to the pivot tube, and a paddle. The paddle is positioned between and secured to the first and second hammers to generate airflow when the first and second hammers are rotated at an operating speed, thereby increasing a throw distance of the material chopped by the flail.

According to a still further embodiment, a flail is provided for use in a bale processor to yield a chopped filamentary material. The flail includes a pivot tube for rotating about an axis, first and second hammers secured to the pivot tube, and a paddle. The paddle is positioned between and secured to the first and second hammers to generate airflow when the first and second hammers are rotated at an operating speed, thereby increasing a throw distance of the chopped filamentary material.

BRIEF DESCRIPTION OF THE DRAWINGS

FIG. 5b is a side view of FIG. 5a.

FIG. 6b is a side view of FIG. 6a.

FIG. 7a shows a respective flail according to one embodiment of the current invention.

FIGS. 7b through 7d show plan views of the flail of FIG. 7a.

FIGS. 8b through 8d show plan views of the flail of FIG. 8a.

FIGS. 9b through 9d show plan views of the flail of FIG. 9a.

FIGS. 10b through 10d show plan views of the flail of FIG. 10a.

FIG. 11a shows a respective flail according to still yet another embodiment of the current invention.

FIGS. 11b through 11d show plan views of the flail of FIG. 11a.

FIG. 12a shows a respective flail according to another embodiment of the current invention.

FIGS. 12b through 12d show plan views of the flail of FIG. 12a.

FIG. 13a shows a respective flail according to still another embodiment of the current invention.

FIGS. 13b through 13d show plan views of the flail of FIG. 13a.

DETAILED DESCRIPTION

Figure 1:
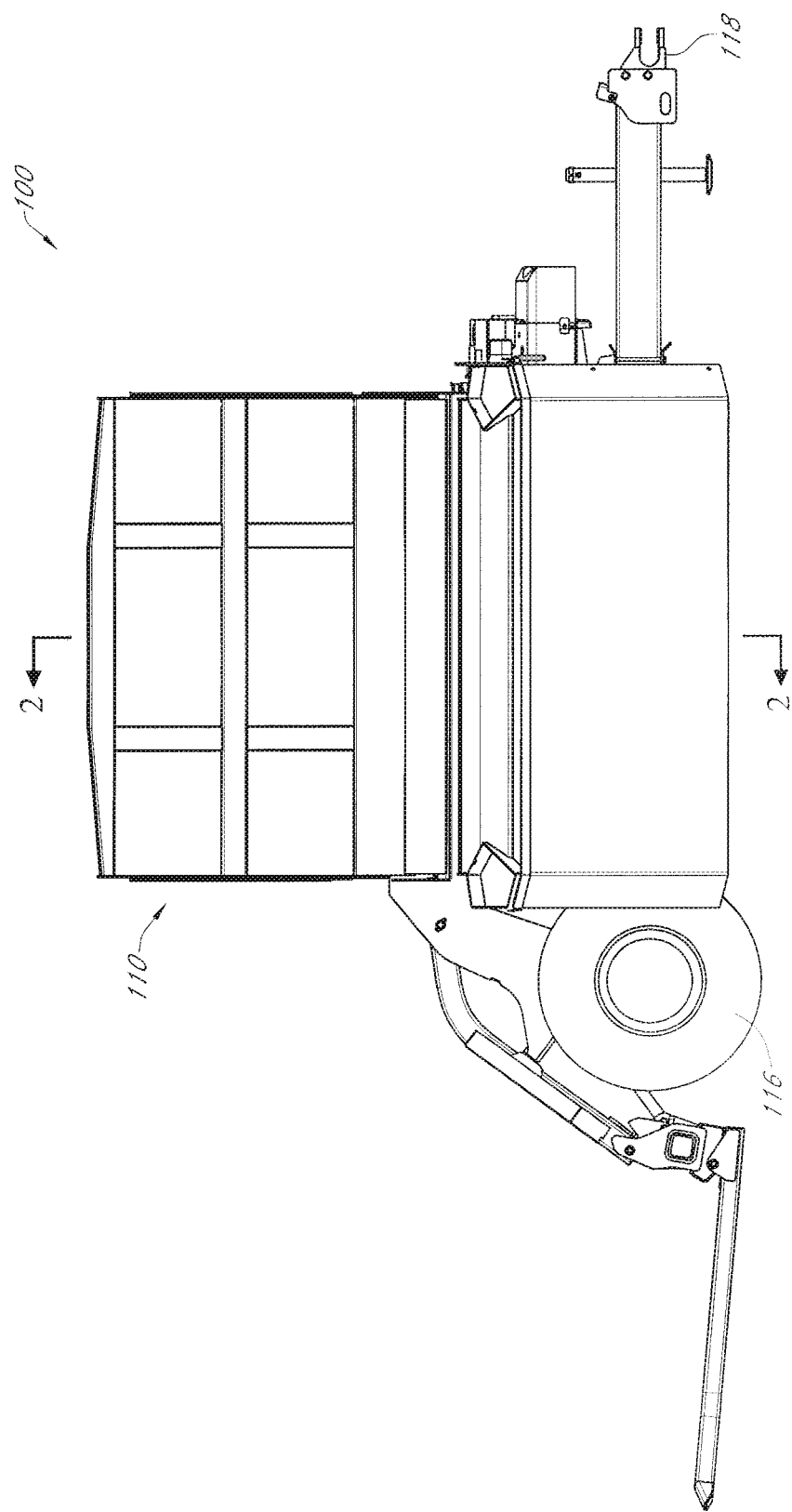
FIG. 1 shows a bale processor according to one embodiment of the current invention.
Figure 2:
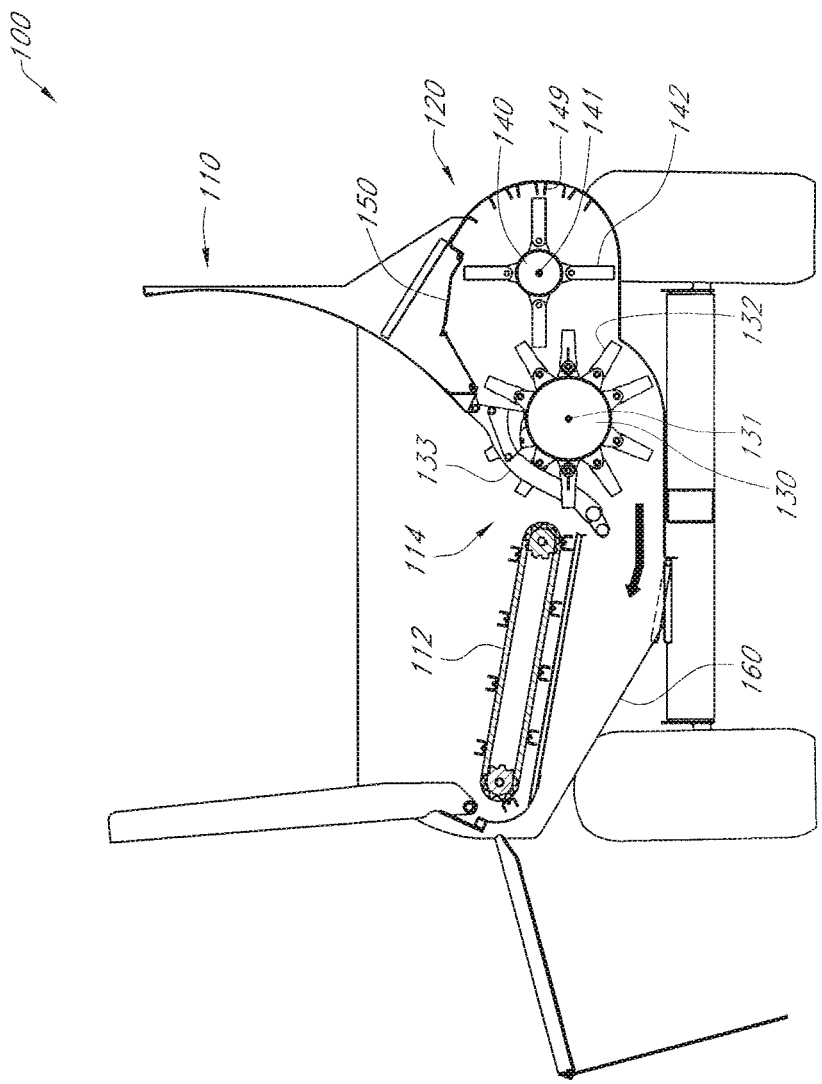
FIG. 2 is a section view taken at line 2-2 of FIG. 1, with a secondary rotor engaged.
Figure 3:
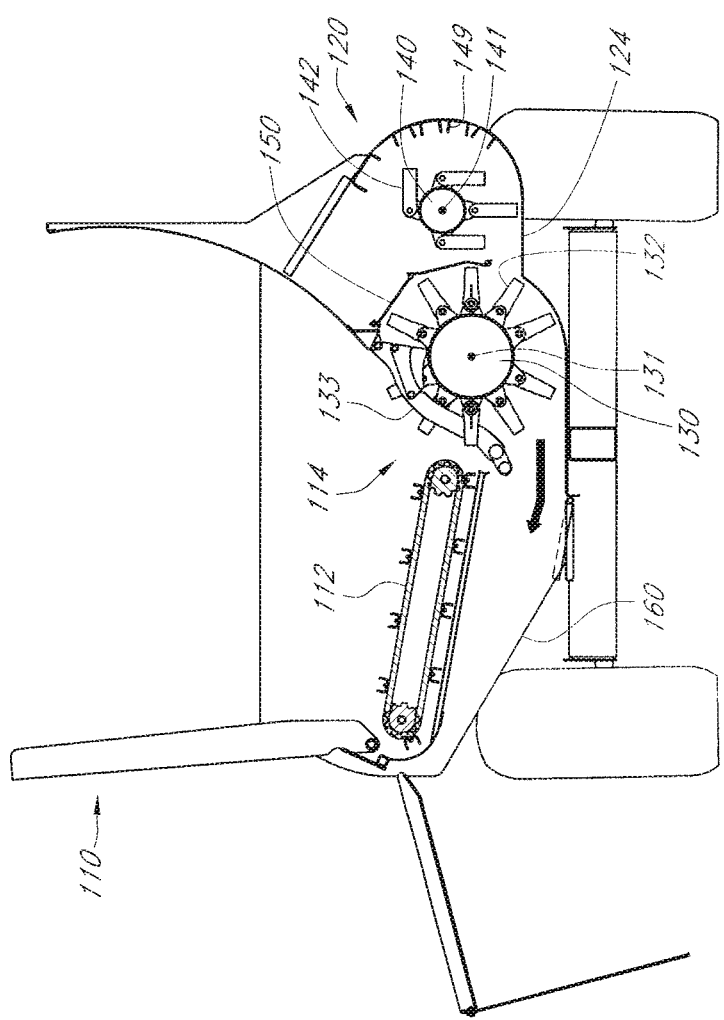
FIG. 3 is a section view taken at line 2-2 of FIG. 1, with the secondary rotor disengaged.

FIGS. 1 through 3 illustrate a bale processor 100, according to one embodiment. The bale processor 100 includes a hopper (or "tub") 110 for receiving bale of forage, bedding, or another bale filamentary material (e.g., hay, straw, corn stover, etc.); a processing section 120 that includes primary and secondary rotors 130, 140; and a discharge opening 160 for outputting processed (or "chopped") bale filamentary material. The terms "primary" and "secondary" are used herein for convenience in referring to the rotors 130, 140 and indicate that the bale filamentary material interacts with the rotor 130 before interacting with the rotor 140 (as described in detail below).

The hopper 110 of embodiment 100 is consistent with "hopper 12" of WO2013/066287. However, as will be appreciated by those skilled in the art, the hopper 110 may be of various configurations, shapes, and sizes. A conveyor 112, as shown in FIGS. 2 and 3, may be included in the hopper 110 to rotate a bale inside the hopper 110. The conveyor 112 of embodiment 100 and its means of operation are consistent with "chain conveyor 16" and the accompanying disclosure in WO2013/066287. But especially since various conveyors are well known, those skilled in the art will understand that alternate types of conveyors and ways of powering conveyors—whether now known or later developed—may be utilized. Further, "conveyor" is used broadly herein to include any various elements (e.g., rotatable wheels and cams) capable of rotating bales inside the hopper 110.

As shown in the drawings, the bale processor 100 may include elements for allowing travel and transport thereof—e.g., wheels 116 and hitch 118. Mobility may not be desirable in all cases, however, and stationary embodiments are clearly contemplated herein.

Attention is now directed to the processing section 120 (FIGS. 2 and 3). The primary rotor 130 is positioned to interact with (i.e., chop) the bale in the hopper 110, preferably—though not necessarily—as the bale rotates due to the conveyor 112. Directions of the primary rotor 130 and the conveyor 112 can each change as desired, but the default direction of both when looking at FIGS. 2 and 3 is clockwise.

The primary rotor 130 may have various cutting configurations for cutting bale filamentary material, whether now known or later developed. In embodiment 100, the primary rotor 130 is consistent with "flail rotor 14" of WO2013/066287. Moreover, at least one control/slug bar 133 consistent with the "depth control bars/slugs 18" of WO2013/066287 is included in embodiment 100 for controlling the distance that an outer end of the rotor 130 extends into an outer surface of a bale in the hopper 110.

Clockwise rotation (in FIGS. 2 and 3) of the primary rotor 130 chops bale filamentary material from a bale in the hopper 110 in an impingement zone 114—as described regarding operation of the "flail rotor 14" in WO2013/066287. But instead of the chopped bale filamentary material always directly exiting the bale processor through a discharge opening once chopped, bale filamentary material in the bale processor 100 may advance in a direction away from the discharge opening 160 to the secondary rotor 140.

The secondary rotor 140 is laterally offset from the primary rotor 130, and it may be desirable for an axis 141 of the secondary rotor 140 to be generally parallel to and higher than an axis 131 of the primary rotor 130 (FIG. 2). Moreover, it may be desirable for the processing section 120 to have a wall 124 extending generally horizontally at least from a point below the axis 141 to a point past extended flails 132 of the primary rotor 140, as shown in FIG. 3.

Figure 5B:
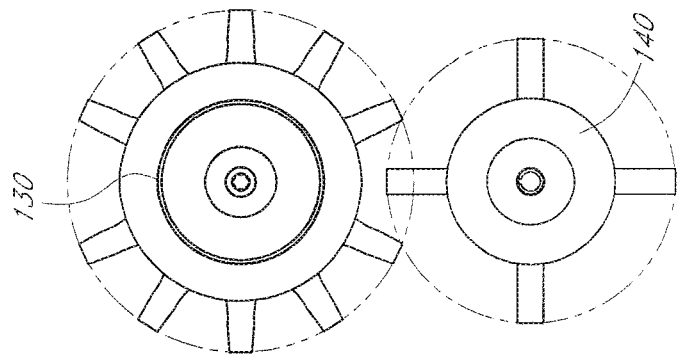
Figure 5A:
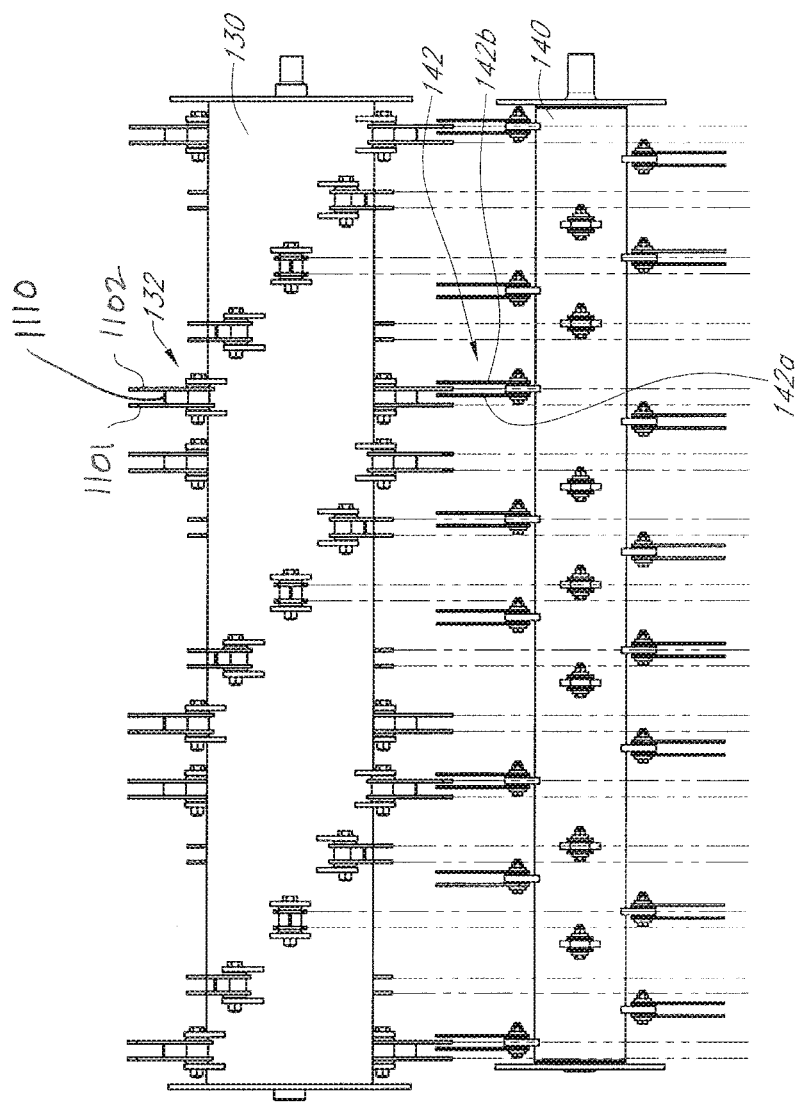
FIG. 5a shows primary and secondary intermeshing rotors according to an embodiment of the current invention.
Figure 6B:
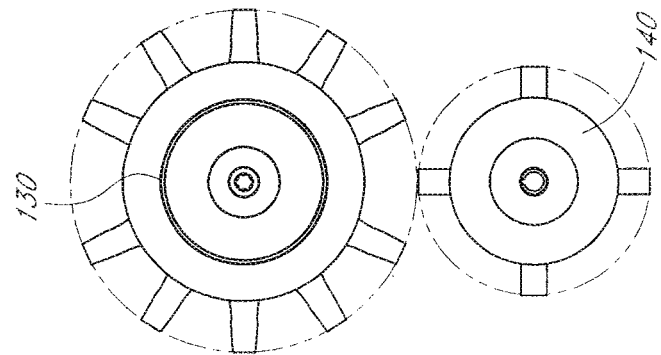
Figure 6A:
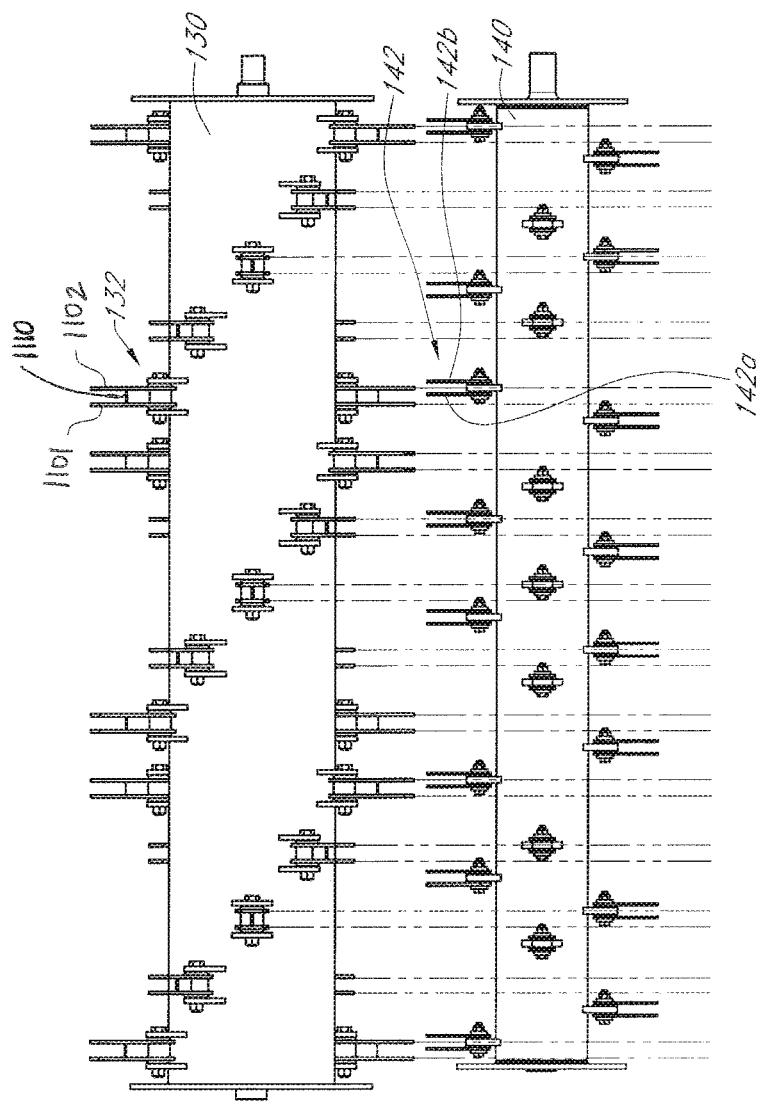
FIG. 6a shows primary and secondary non-intermeshing rotors according to another embodiment of the current invention.
Figure 8D:
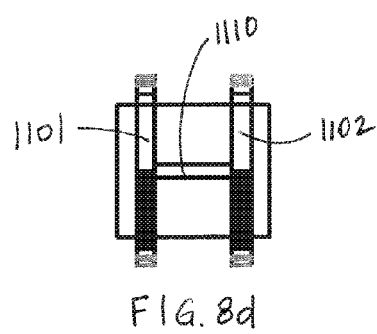
Figure 8A:
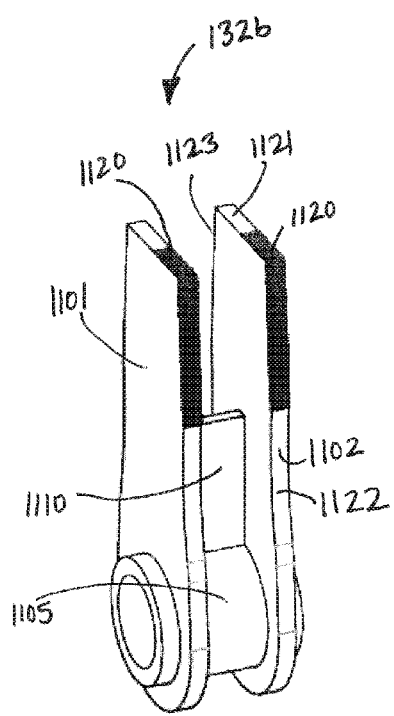
FIG. 8a shows a respective flail according to another embodiment of the current invention.
Figure 8C:
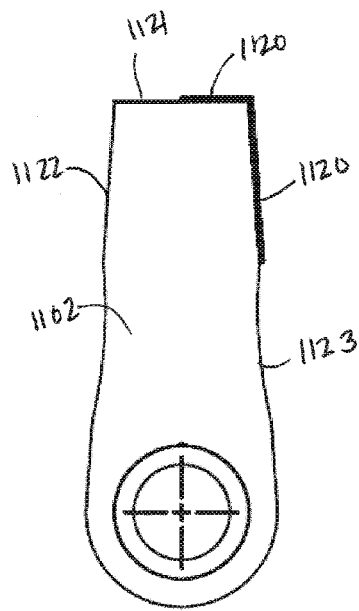
Figure 8B:
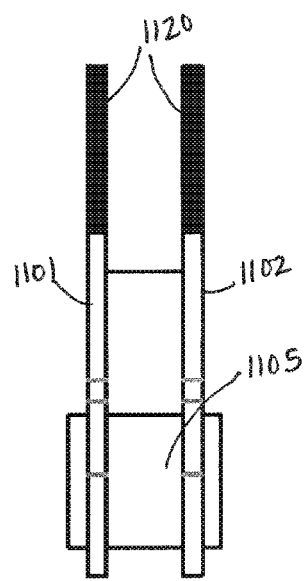
Figure 9D:
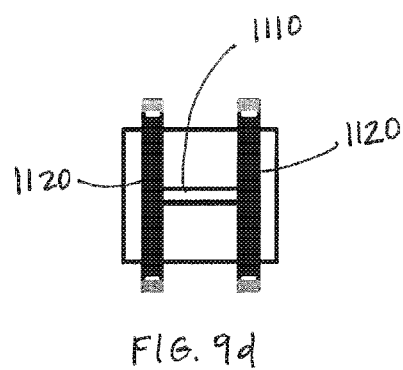
Figure 9A:
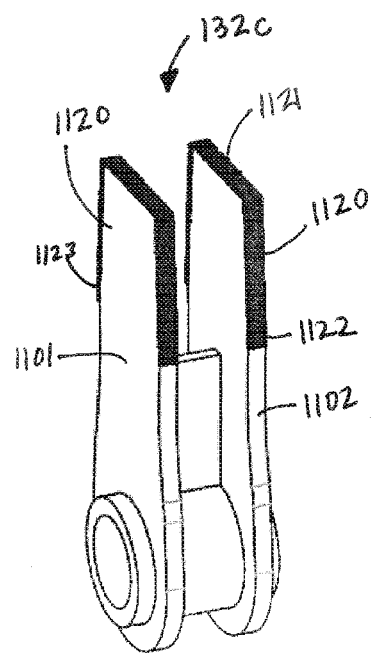
FIG. 9a shows a respective flail according to yet another embodiment of the current invention.
Figure 9C:
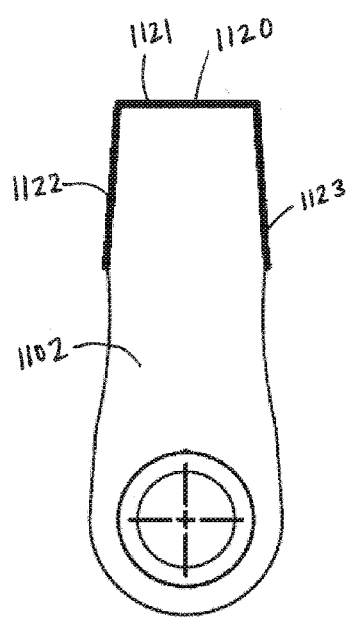
Figure 9B:
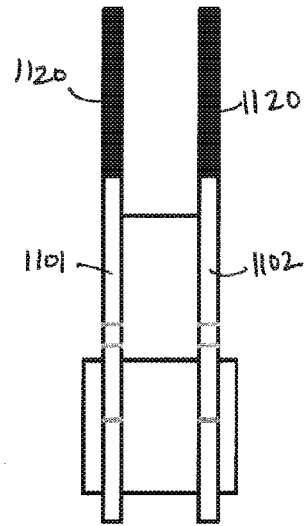
Figure 10D:
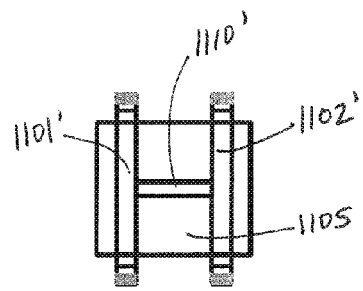
Figure 10C:
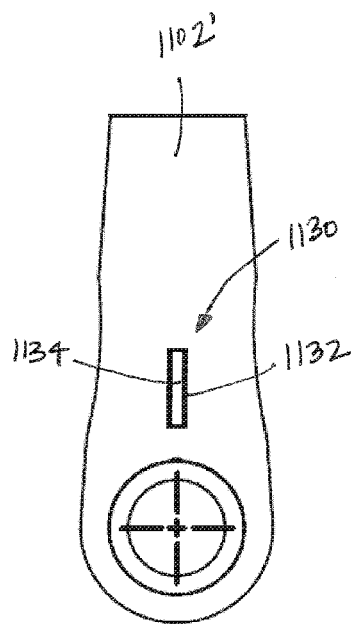
Figure 10B:
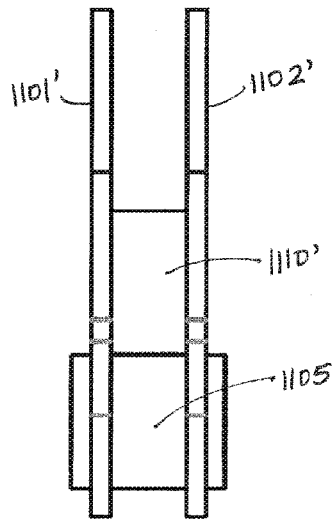
Figure 10A:
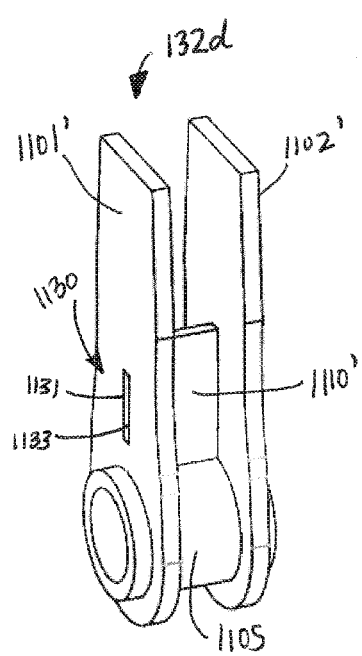
FIG. 10a shows a respective flail according to still another embodiment of the current invention.

As with the primary rotor 130, the secondary rotor 140 may be configured in various ways to cut bale filamentary material. In some embodiments, the secondary rotor 140 intermeshes with the primary rotor 130 when in use; in other embodiments, the rotors 130, 140 are non-intermeshing. An example intermeshing arrangement is shown in FIGS. 5a and 5b, and an example non-intermeshing arrangement is shown in FIGS. 6a and 6b. Intermeshing may increase the transfer of bale filamentary material between the rotors 130, 140.

In both FIG. 5a and FIG. 6a, flails 132 have an integrated design (e.g., portions co-molded, co-formed, forge, metallurgically joined, et cetera) with two blades (or "hammers") 1101, 1102, and a paddle (which may also be referred to as "webbing" or a "gusset") 1110 may extend between the blades 1101, 1102. Flails 142 are similarly shown having two blades 142a, 142b. Blades 142a, 142b do not have an integrated design in FIGS. 5a and 6a; instead, the blades 142a, 142b are individual, free swinging blades mounted on either side of a common pivot, such as by a common bolt, but in other embodiments an integrated design may be used. While two blades are not required in all embodiments, they may provide increased mass and stability over a single blade, and may lose less energy (and therefore put more energy into a cutting action) than a single blade. Further, a two-blade intermeshing arrangement may provide still improved transfer of bale filamentary material between the rotors 130, 140. For example, the intermeshing arrangement may reduce the distance that bale filamentary material must travel unassisted, greatly reducing the probability of wet material sticking or stopping forward travel (causing a plugged condition).

FIGS. 7a through 7d further illustrate a respective flail 132 according to one embodiment 132a. Here, the first and second hammers 1101, 1102 are secured together (by welding, forging, co-forming such as casting, or any other appropriate fastening or forming method, whether now known or later developed) to a pivot tube 1105 configured to rotate about an axis. The paddle 1110 is positioned between and secured to the first and second hammers 1101, 1102 (again, secured together by welding, co-forming, or any other appropriate fastening or forming method, whether now known or later developed) to generate airflow during operation of a given bale processor and to increase a throw distance of material chopped during operation of the given bale processor. The paddle 1110 in embodiment 132a extends from the pivot tube 1105, and it may be desirable for the paddle 1110 and the pivot tube 1105 to collectively extend between about 25% to about 50% of a length 1112 of the hammers 1101, 1102—especially for embodiments that utilize intermeshing (as discussed above and shown in FIGS. 5a and 5b, for example). The percentage extension may be chosen based on such factors as mechanical stability, airflow/throw promotion, clearance relative to other parts while in motion, et cetera. Especially for embodiments that do not utilize intermeshing (as discussed above and shown in FIGS. 6a and 6b, for example), the paddle 1110 and the pivot tube 1105 may collectively extend up to the full length 1112 of the hammers 1101, 1102. While the paddle 1110 in embodiment 132a is generally planar and perpendicular to the hammers 1101, 1102, other embodiments may utilize different shapes (e.g., arcuate) for the paddle 1110, and/or the paddle may be angled relative to the hammers 1101, 1102. The paddle configuration and location may be selected to optimize an amount of airflow generated by the paddle 1110 when the first and second hammers 1101, 1102 are rotated at operating speed (i.e., whatever speed at which the hammers 1101, 1102 rotate when chopping material), and generated airflow may increase a throw distance of the material chopped by the flail 132. It should be further understood that the configuration (e.g., construction and/or angular placement) of a given paddle 1110 may be chosen, at least in part, for structural/stability considerations as well.

FIGS. 8a through 8d illustrate the flail 132 according to another embodiment 132b. Embodiment 132b is substantially similar to embodiment 132a, but hardfacing 1120 is included in embodiment 132b. More particularly, for each hammer 1101, 1102, a distal top edge face 1121 extends between and adjoins first and second longitudinal edge faces 1122, 1123, and at least a portion of the distal top edge face 1121 and the first longitudinal edge face 1122 includes hardfacing 1120. Hardfacing may be particularly useful on the surfaces 1121, 1122, as these surfaces may be the primary chopping surfaces when in use.

Hardfacing, which may improve cutting characteristics and/or extend the service life of the flail 132, is discussed in detail in U.S. provisional patent applications 62/077,142 61/898,037 and PCT Application Number PCT/US2014/063336, which are incorporated herein in their entireties by reference. Hardfacing may include a carbide material, and may be formed by a welding process in which carbide particles are fed into the weld pool. The hardfacing can be classified by the type of carbide particles that are fed into the welding process. For example, a silicon carbide based hardfacing may be formed by the addition of silicon carbide particles to the weld pool. Exemplary carbide particles include silicon carbide particles, boron carbide particles, and tungsten carbide particles, and combinations thereof.

It may be particularly desirable for the hammers 1101, 1102 to be constructed of steel and the deposited hardfacing material to be silicon carbide based. The hardfacing may, for example, be deposited on the steel by feeding silicon carbide particles and a welding wire composition as part of a gas metal arc welding process, whereby the silicon carbide particles at least partially dissolve in the molten welding wire. A portion of the carbon from the silicon carbide may precipitate in the form of at least one iron carbide in the hardfacing layer. Further, some of the silicon may also alloy with the hammers 1101, 1102 and the welding wire composition, and at least a portion of the carbon from the silicon carbide may precipitate in the form of at least one iron carbide in the hardfacing layer. In other embodiments, tungsten carbide, boron carbide, and other materials may be used.

FIGS. 9a through 9d illustrate the flail 132 according to another embodiment 132c. Embodiment 132c is substantially similar to embodiment 132b, but hardfacing 1120 is included on the second longitudinal edge face 1123 for each hammer 1101, 1102, as well as on the distal top edge faces 1121 and the first longitudinal edge faces 1122. Hardfacing may be particularly useful on the surface 1123 if the flail 132 is intended to be reversible (either capable of operating in both clockwise and counterclockwise rotation or capable of being re-installed such that the surface 1123 is the primary chopping surface after the surface 1122 becomes dulled).

FIGS. 10a through 10d illustrate the flail 132 according to another embodiment 132d. Embodiment 132d is substantially similar to embodiment 132a, but a tab and slot configuration 1130 is used to further couple paddle 1110' to hammers 1101', 1102'. More particularly, the first hammer 1101' has a first slot 1131, the second hammer 1102' has a second slot 1132, the paddle 1110' has a first tab 1133 engaging the first slot 1130, and the paddle 1110' has a second tab 1134 engaging the second slot 1131. Welding, adhesive, and/or any other appropriate fastener may be used in conjunction with the tab and slot configuration.

FIGS. 11a through 11d and FIGS. 12a through 12d illustrate the flail 132 according to still other embodiments 132e, 132f. Embodiments 132e, 132f are substantially similar to embodiments 132b, 132c, respectively, but the slot and tab configuration 1130 of embodiment 132d is also included in embodiments 132e, 132f.

FIGS. 13a through 13d illustrate the flail 132 according to still another embodiment 132g. Embodiment 132g is substantially similar to embodiment 132d, but paddle 1110" extends further toward face 1121' and includes a void 1115. More particularly, extensions 1114 stretch from a main portion 1113 toward distal top edge faces 1121'. This additional paddle length—and specifically the extensions 1114—may provide enhanced structural support for the hammers 1101, 1102, while the void 1115 between the extensions 1114 may allow an intermeshing element (e.g., a rotatable flail or a stationary knife) to pass between the hammers 1101', 1102', as is possible in the embodiment 132d. One skilled in the art will appreciate that this paddle configuration may be incorporated into any of embodiments 132a through 132f.

Returning now to FIGS. 2 and 3, rasp bars 149 may be adjacent the secondary rotor 140 to agitate material rotated by the secondary rotor 140, increasing the chopping effectiveness of the secondary rotor 140. Additionally, or alternately, rasp bars may be formed with or coupled to the secondary rotor 140 (such as protrusions from a twelve o'clock position to a six o'clock position along the secondary rotor 140, for example) to keep the bale filamentary material agitated and thus chopped multiple times.

Gearing or other power-transmitting devices (e.g., belts and pulleys, chains and sprockets, etc.) may allow a single motor to power both the primary rotor 130 and the secondary rotor 140 (and further the conveyor 112), though multiple motors or other rotation-inducing devices may be used. Further, while the secondary rotor 140 may rotate opposite the primary rotor 130, it may be desirable for both to rotate in the same direction (e.g., clockwise in FIG. 2). In the embodiment 100, the secondary rotor 140 is smaller than the primary rotor 130 and rotates at a higher RPM. It may be desirable for the secondary rotor 140 to rotate at least fifty percent faster than the primary rotor 130, even more desirable for the secondary rotor 140 to rotate at least eighty-five percent faster than the primary rotor 130, and even still more desirable for the secondary rotor 140 to rotate at least twice as fast as the primary rotor 130. For example, the primary rotor 130 may rotate at approximately 1500 RPM and the secondary rotor 140 may rotate at approximately 3000 RPM. In commercial embodiments of the bale processor in WO2013/066287, rotation of the "flail rotor 14" may be at approximately 1000 RPM to achieve similar throw distances.

To allow the bale processor 100 to selectively utilize the secondary rotor 140, the secondary rotor 140 may be selectively engaged/disengaged from the power-transmitting device (e.g., through a transmission or movement of the secondary rotor 140) and an internal deflector 150 may selectively remove/provide a partition between the primary and secondary rotors 130, 140. As discussed further below, movement of the internal deflector 150 may be synchronized with engagement/disengagement of the secondary rotor 140.

Figure 4:
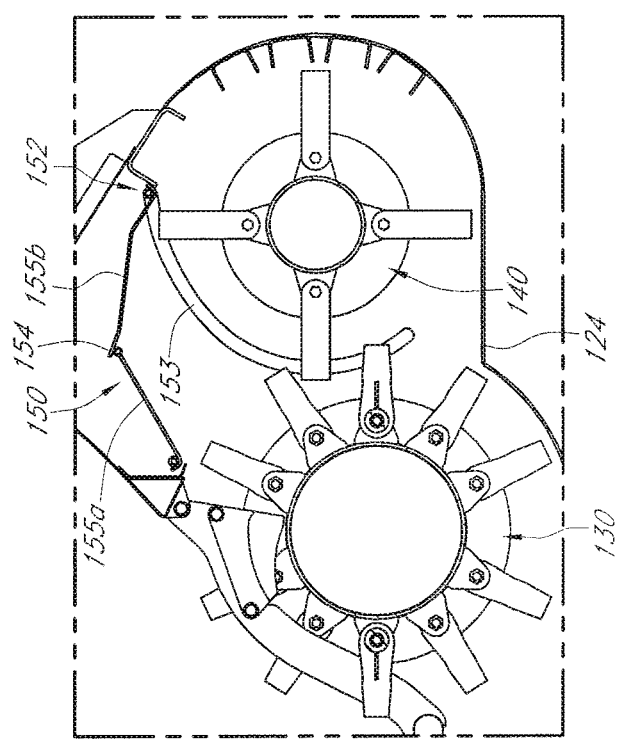
FIG. 4 shows structure for moving an internal deflector, according to an embodiment of the current invention.

The internal deflector 150 may have numerous configurations and methods of moving between disengaged (FIG. 2) and engaged (FIG. 3) positions. For example, the deflector 150 may have an end 152 that travels along a track 153 (FIG. 4), and a pivot 154 may allow sections 155a, 155b to move relative to one another. Particularly in embodiments with intermeshing rotors 130, 140, it may be desirable for the primary and secondary rotors 130, 140 to respectively have flails 132, 142 that fall freely when not in use. FIG. 3 shows the secondary rotor 140 disengaged and the flails 142 falling freely. But even in these embodiments, however, stationary knife sections may form part of the primary rotor 130 or the secondary rotor 140 to create an additional slicing action. For example, stationary knife sections may extend from a twelve o'clock position to a six o'clock position along the secondary rotor 140.

To ensure that the secondary rotor 140 remains disengaged when the internal deflector 150 is in the engaged (or "blocking") position, the mechanism for disengaging the secondary rotor 140 may be mechanically or electrically (e.g., through sensors and computer programming) linked to the mechanism for moving the internal deflector 150. In one embodiment, a gearbox and driveline mechanism is used to engage/disengage the secondary rotor 140 and move the internal deflector 150.

In use, after the primary rotor 130 chops bale filamentary material from a bale in the hopper 110 as described above, the chopped bale filamentary material passes from the primary rotor 130 to the secondary rotor 140 (FIG. 2). By traveling in the same direction as the primary rotor 130 (e.g., clockwise in FIG. 2), the secondary rotor 140 further chops the bale filamentary material and causes the bale filamentary material to change direction (e.g., from traveling downwardly about the axis 131 to traveling upwardly and clockwise about the axis 141). The bale filamentary material then rotates back to the primary rotor 130, where it is chopped still further and resumes its travel about the axis 131 to be discharged through the discharge opening 160. The paddle 1110 may generate airflow and increase a throw distance of chopped filamentary material out the discharge opening 160. The described arrangement of the processing section 120 causes the bale filamentary material to be chopped three distinct times (twice by the primary rotor 130 and once by the secondary rotor 140) and may provide substantial reductions in bale filamentary material length in relatively short order.

Cut lengths of approximately three inches and under may be desirable in various applications. For example, forage must generally be no longer than three inches to be used in a Total Mixed Ration (TMR) mixer wagon. Similarly, some methods of biomass processing of bale filamentary material may benefit from relatively small cut lengths. Yet such a fine cut is not always necessary or desirable. When a fine cut is not needed, the secondary rotor 140 may be disengaged and the internal deflector 150 may be moved to the blocking position (FIG. 3) as discussed above. In this arrangement, after the primary rotor 130 chops bale filamentary material from a bale in the hopper 110 as described above, the chopped bale filamentary material rotates with the primary rotor 130 about the axis 131 and is discharged through the discharge opening 160 without being impeded by the secondary rotor 140.

An operator may perform maintenance on the primary rotor 130 through the discharge opening 160, and the secondary rotor 140 may be accessed (e.g., from a standing position) by removing an external portion of the processing section 120.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A flail for use in a bale processor to yield a chopped filamentary material, the flail comprising:
   a pivot tube for rotating about an axis, the pivot tube extending continuously between a first hammer and a second hammer; and
   a paddle extending directly from the pivot tube and positioned between and secured to the first and second hammers, the paddle generating airflow when the first and second hammers are rotated at an operating speed, thereby increasing a throw distance of the chopped filamentary material.

2. The flail of claim 1, wherein the first hammer has a cutting face having a hardfacing material deposited thereon to form a hardfacing layer.

3. The flail of claim 2, wherein the deposited hardfacing material comprises a carbide material.

4. The flail of claim 3, wherein the hardfacing material comprises at least one material selected from the group consisting of: a tungsten carbide based hardfacing material, a silicon carbide based hardfacing material, and a boron carbide based hardfacing material.

5. The flail of claim 4, wherein:
the first hammer comprises steel;
the hardfacing material is silicon carbide based; and
the silicon carbide is deposited on the steel along with a welding wire composition.

6. The flail of claim 5, wherein the paddle and the pivot tube collectively extend between about 25% to 50% of a length of the first hammer.

7. The flail of claim 1, wherein the first hammer and the second hammer each have:
a first longitudinal edge face;
a second longitudinal edge face; and
a distal top edge face extending between and adjoining the first longitudinal edge face and the second longitudinal edge face.

8. The flail of claim 7, wherein the distal top edge face of the first hammer and the distal top edge face of the second hammer has a hardfacing layer thereon.

9. The flail of claim 8, wherein:
at least one of the first longitudinal edge face and the second longitudinal edge face of the first hammer has a hardfacing layer thereon; and
at least one of the first longitudinal edge face and the second longitudinal edge face of the second hammer has a hardfacing layer thereon.

10. The flail of claim 1, wherein the paddle is substantially planar.

11. The flail of claim 1, wherein the first hammer has a first slot, the second hammer has a second slot, the paddle has a first tab engaging the first slot, and the paddle has a second tab engaging the second slot.

12. The flail of claim 1, wherein the first and second hammers are hardfaced using at least one of a laser cladding process and a gas metal arc welding hardfacing process.

13. The flail of claim 1, wherein the flail further comprises a void between the first and second hammers, the void allowing an intermeshing element to pass between the first and second hammers, the intermeshing element being selected from the group consisting of a rotatable flail and a stationary knife.

14. The flail of claim 13, wherein:
the first and second hammers each have a proximal end and a distal end;
the pivot tube is adjacent the first hammer proximal end and the second hammer proximal end; and
the paddle includes a main portion and an extension stretching from the main portion toward the first hammer distal end, the void being defined beside the extension to allow the intermeshing element to pass between the first and second hammers.

15. The flail of claim 1, wherein:
the first and second hammers each have a proximal end and a distal end;
the pivot tube is adjacent the first hammer proximal end and the second hammer proximal end;
the paddle includes a main portion, a first extension stretching from the main portion toward the first hammer distal end, and a second extension stretching from the main portion toward the second hammer distal end;
a void is defined between the first extension and the second extension to allow the intermeshing element to pass between the first and second hammers.

16. A bale processor, comprising:
a hopper for receiving a bale of baled material;
a discharge opening for outputting chopped material; and
a processing section having primary and secondary rotors;
the primary rotor having an axis of rotation and a rotatable flail to chop the material from the bale received in the hopper; the secondary rotor being rotatable to chop the material after being chopped by the primary rotor; the secondary rotor being offset from the primary rotor such that the primary rotor is between the secondary rotor and the discharge opening;
wherein the flail comprises:
a pivot tube for rotating about the axis of rotation, the pivot tube extending continuously between a first hammer and a second hammer; and
a paddle extending directly from the pivot tube and positioned between and secured to the first and second hammers to generate airflow when the first and second hammers are rotated at an operating speed, thereby increasing a throw distance of the material chopped by the flail.

17. The bale processor of claim 16, wherein the first hammer has a cutting face having a hardfacing material deposited thereon to form a hardfacing layer.

18. The bale processor of claim 17, wherein:
the first hammer comprises steel;
the hardfacing material is silicon carbide based; and
the silicon carbide is deposited on the steel along with a welding wire composition.

19. The bale processor of claim 16, wherein the first hammer has a first slot, the second hammer has a second slot, the paddle has a first tab engaging the first slot, and the paddle has a second tab engaging the second slot.

* * * * *